United States Patent
Shi

(10) Patent No.: US 8,379,650 B2
(45) Date of Patent: Feb. 19, 2013

(54) METHOD AND DEVICE FOR PROVIDING SERVICES FOR USER

(75) Inventor: Shufeng Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 12/837,773

(22) Filed: Jul. 16, 2010

(65) Prior Publication Data

US 2010/0278041 A1 Nov. 4, 2010

Related U.S. Application Data

(63) Continuation of application No. PCT/CN2009/070125, filed on Jan. 13, 2009.

(30) Foreign Application Priority Data

Jan. 18, 2008 (CN) .......................... 2008 1 0001412
Mar. 28, 2008 (CN) .......................... 2008 1 0090549

(51) Int. Cl.
*H04L 12/28* (2006.01)

(52) U.S. Cl. .................................. 370/395.52

(58) Field of Classification Search .......... 370/328–339, 370/352, 395.5–395.52; 455/433, 435.1
See application file for complete search history.

(56) References Cited

U.S. PATENT DOCUMENTS

| | | | | |
|---|---|---|---|---|
| 7,899,036 | B2 * | 3/2011 | Shen ............................. | 370/352 |
| 8,069,365 | B2 * | 11/2011 | Gu et al. ........................ | 714/4.1 |
| 2005/0276229 | A1 | 12/2005 | Torabi | |
| 2007/0189215 | A1 | 8/2007 | Wu et al. | |
| 2007/0266085 | A1 | 11/2007 | Rajko et al. | |
| 2007/0275710 | A1 | 11/2007 | Mayer et al. | |
| 2008/0160996 | A1 | 7/2008 | Li et al. | |
| 2008/0227451 | A1 * | 9/2008 | Fukui et al. ................ | 455/435.1 |
| 2010/0165833 | A1 | 7/2010 | Du et al. | |
| 2010/0257272 | A1 | 10/2010 | Belinchón Vergara et al. | |
| 2011/0028130 | A1 | 2/2011 | Swaminathan et al. | |
| 2011/0182173 | A1 | 7/2011 | Shi | |

FOREIGN PATENT DOCUMENTS

| | | |
|---|---|---|
| CN | 1610330 A | 4/2005 |
| CN | 1655546 A | 8/2005 |
| CN | 1805452 A | 7/2006 |
| CN | 1874279 A | 12/2006 |

(Continued)

OTHER PUBLICATIONS

International Search Report from P.R. China in International Application No. PCT/CN2009/070125 mailed Apr. 9, 2009.

(Continued)

*Primary Examiner* — Frank Duong
(74) *Attorney, Agent, or Firm* — Slater & Matsil, L.L.P.

(57) ABSTRACT

A method and a device for providing services for a user are provided. The method includes receiving, by an interrogating call session control function (I-CSCF), a failure response returned by a first serving call session control function (S-CSCF) after the I-CSCF selects the first S-CSCF for the user according to a capability set of an S-CSCF returned by a home subscriber server (HSS) and forwards a service request to the first S-CSCF; obtaining, by the I-CSCF, information of a second S-CSCF, and forwarding the service request from the user to the second S-CSCF. Therefore, when multiple identities of the user simultaneously generate unregistered services, when they generate registration requests at the time of generating unregistered services, or when they simultaneously generate registration requests, the I-CSCF forwards the service request from the user to a corresponding S-CSCF for processing, thus enabling a network to normally provide services for the user.

14 Claims, 15 Drawing Sheets

Receive a failure response returned by a first S-CSCF after selecting the first S-CSCF for a user according to a capability set of the S-CSCF returned by an HSS and forwarding a service request to the first S-CSCF — S 701

The I-CSCF obtains information of the second S-CSCF, and forwards the service request from the user to the second S-CSCF — S 702

FOREIGN PATENT DOCUMENTS

| | | |
|---|---|---|
| CN | 1878087 A | 12/2006 |
| CN | 101489174 A | 7/2009 |
| EP | 1 775 902 A1 | 4/2007 |
| WO | WO2005039108 A2 | 4/2005 |
| WO | WO2007129163 A2 | 11/2007 |

OTHER PUBLICATIONS

Office Action issued in Chinese Patent Application No. 200810090549.9 mailed Oct. 23, 2009.

GSM, "3rd Generation Partnership Project; Technical Specification Group Core Network and Terminals; IP Multimedia (IM) Subsystem Cx and Dx interfaces; Signalling flows and message contents (Release 8)", 3GPP TS 29.228, V. 8.0.0, pp. 1-62, (Dec. 2007).

Extended European Search Report dated (mailed) Feb. 9, 2011, issued in related Application No. 09704310.3-1244/2234364, PCT/CN2009070125, filed Jan. 13, 2009, Hauwei Technologies Co., Ltd.

XP14032498A1 ETSI TS 124 229 V5.15.0, Digital cellular telecommunications system (Phase 2+); Universal Mobile Telecommunications System (UMTS); Internet Protocol (IP) multimedia call sontrol protocol based on Session Initiation Protocol (SIP) and Session Description Protocol (SDP); Stage 3 (3GPP TS 24.229 version 5.15.0 Release 5) Dec. 2005.

Written Opinion of the International Searching Authority, PCT Application No. PCT/CN2009/070125, Applicant: Huawei Technologies Co., LTD.; et al., Mailing date: Apr. 9, 2009, 4 pages.

First Chinese Office Action, Chinese Application No. 201110070420.3, Mailing date: Aug. 31, 2011, 15 pages.

\* cited by examiner

METHOD AND DEVICE FOR PROVIDING SERVICES FOR USER

CROSS-REFERENCE TO RELATED APPLICATIONS

This application is a continuation of International Application No. PCT/CN2009/070125, filed on Jan. 13, 2009, which claims priority to Chinese Patent Application No. 200810001412.1, filed on Jan. 18, 2008 and Chinese Patent Application No. 200810090549.9, filed on Mar. 28, 2008, all of which are hereby incorporated by reference in their entireties.

FIELD OF THE TECHNOLOGY

The present invention relates to the field of communication technology, and more particularly to a method and a device for providing services for a user.

BACKGROUND OF THE INVENTION

With the development of technologies in the communication field, Internet Protocol (IP) multimedia subsystem (IMS) will become the fixed and mobile core network of the next generation, and the development tendency and network evolution process of the diversities of access technology and service-providing, bearer by IP, and core network being integrated into IMS will emerge. Users will have better service experiences in the IMS network.

User identities used in a current IMS network mainly include IP multimedia private user identities (IMPIs) and IP multimedia public user identities (IMPUs). These user identities are stored in a home subscriber server (HSS) by subscription. When a user makes relevant service operation, relevant entities in the network, such as an interrogating call session control function (I-CSCF), a serving call session control function (S-CSCF), and an application server (AS), obtain subscription data of the relevant user from HSS via user identity.

The relationships between user identities and between user identity and subscription data in IMS are relatively complicated, in which:

One IMS subscription includes all subscription information that might be delivered via a Cx interface by a subscriber, which may include multiple IMPIs, but one IMPI can only belong to one IMS subscription;

One IMPI may include multiple IMPUs, and one IMPU may be shared by multiple IMPIs;

That is to say, the relationship between the IMS subscription and the IMPI is one-to-many, and the relationship between the IMPI and the IMPU is many-to-many.

In the IMS network, after being registered with the network, user equipment (UE) may use various services offered by the IMS network. Meanwhile, the UE may select to subscribe to unregistered services. When the UE has not registered with the network, the network can still provide the user with unregistered services, such as incoming call forwarding and incoming call record.

The current network has a restriction that all the user identities under one IMS subscription will be provided with services by the same S-CSCF. Accordingly, the following problems will occur under the following situations.

(1) When the user has both an unregistered termination request or an unregistered initiation request initiated by the AS instead of the user and a registration request, the unregistered request services will fail if the I-CSCF successively selects different S-CSCFs for the user to provide services.

(2) When the user has two or more unregistered termination requests or unregistered initiation requests initiated by the AS instead of the user, if the I-CSCF successively selects different S-CSCFs for the user to provide services, the second S-CSCF, after requesting user-unregistered service data, will receive a failure response from the HSS indicating that the user with unregistered services cannot be provided.

(3) When multiple terminals of the user all have registered, if the I-CSCF successively selects different S-CSCFs for the user to provide services, after an S-CSCF1 selected in the registration process of the first terminal sends MAR (multimedia authenticate request) request authentication data to the HSS, the HSS will save the name of the S-CSCF1. Before a second registration message of the first terminal reaches the I-CSCF, if an S-CSCF2 selected in the registration process of a second terminal sends MAR request authentication data to the HSS, and the HSS will save the name of the S-CSCF2 and overwrite the name of the S-CSCF1. The successive registration message of the first terminal will be routed to the S-CSCF2. At this time, the first terminal registration will fail because the S-CSCF2 has no user information.

SUMMARY OF THE INVENTION

Accordingly, the present invention is directed to a method and a device for providing services for a user, so that when multiple identities of the user simultaneously generate unregistered services, when they generate registration requests at the time of generating unregistered services, or when they simultaneously generate registration requests, a network can normally provide services for the user.

In order to achieve the above objectives, in an embodiment, the present invention provides a method for providing services for a user, including receiving a failure response returned by a first S-CSCF after an I-CSCF selects the first S-CSCF for the user and forwards a service request to the first S-CSCF; and obtaining, by the I-CSCF, information of a second S-CSCF, and forwarding the service request from the user to the second S-CSCF, in which the second S-CSCF is the one currently recorded by an HSS for the user.

In another embodiment, the present invention further provides a device for providing services for a user. The device includes a response receiving module adapted to receive a failure response returned by a first S-CSCF after the first S-CSCF is selected for the user and a service request is forwarded to the first S-CSCF; a second S-CSCF obtaining module adapted to obtain information of a second S-CSCF after the failure response returned by the first S-CSCF is received, in which the second S-CSCF is the one currently recorded by an HSS for the user; and a request forwarding module adapted to forward the service request from the user to the second S-CSCF after the information of the second S-CSCF is obtained.

In still another embodiment, the present invention further provides a method for providing services for a user, including determining whether a last selection of an S-CSCF for the user has finished or whether it is overtime after an HSS receives a second request message requesting a capability set of an S-CSCF providing services to the user or a name of the S-CSCF sent by an I-CSCF, and if so, the HSS returns the capability set or the name of the S-CSCF to the I-CSCF.

In further still another embodiment, the present invention further provides a device for providing services for a user. The device includes a capability set request receiving module adapted to receive a second request message requesting a capability set or a name of an S-CSCF providing services to the user sent by an I-CSCF; and an information returning module adapted to return the capability set or the name of the S-CSCF to the I-CSCF when it is determined that a last selection of the S-CSCF for the user has finished or been overtime.

Compared with the prior art, embodiments of the present invention at least have the following advantages.

Through the embodiments of the present invention, when multiple identities of the user simultaneously generate unregistered services, when they generate registration requests at the time of generating unregistered services, or when they simultaneously generate registration requests, the I-CSCF will forward the service request from the user to a correct S-CSCF for processing, so that the network can normally provide services for the user under all three foregoing situations.

DETAILED DESCRIPTION OF THE EMBODIMENTS

Embodiments of the present invention provide a method for providing services for a user. Through the embodiments of the present invention, when an S-CSCF requests user subscription data, after it receives an indication from an HSS that error codes of different S-CSCFs have been assigned to the user, the S-CSCF returns the failure codes to an I-CSCF. Again, the I-CSCF requests, from the HSS, the name of S-CSCF, and forwards the service request to the S-CSCF assigned to the user. As a result, the user can be provided with normal services.

Figure 1:
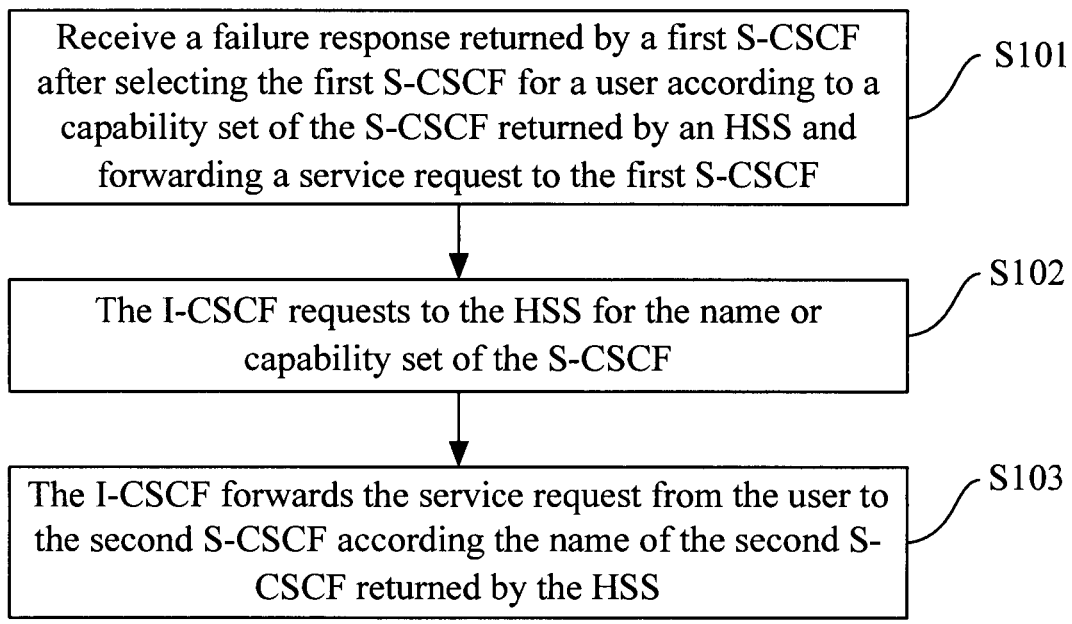
FIG. 1 is a flow chart of a method for providing services for a user according to an embodiment of the present invention.

Referring to FIG. 1, a flow chart of a method for providing services for a user according to an embodiment of the present invention is shown, and the method includes the following steps.

In step S101, a failure response returned by a first S-CSCF is received after selecting the first S-CSCF for a user according to a capability set of the S-CSCF returned by an HSS and forwarding a service request to the first S-CSCF.

Before the first S-CSCF returns the failure response to the I-CSCF, the first S-CSCF receives the service request forwarded by the I-CSCF and requests, from the HSS, the subscription data of the user. The first S-CSCF is selected by the I-CSCF according to the capability set of the S-CSCF returned by the HSS.

When the first S-CSCF requests, from the HSS, the subscription data of the user, if the HSS finds that the name of the first S-CSCF is not the same as the stored name of the S-CSCF assigned to the user, the HSS returns failure indication information to the first S-CSCF, so as to indicate that another S-CSCF different from the first S-CSCF has already been assigned to the user. Then, the first S-CSCF sends a failure response to the I-CSCF according to the failure indication information returned by the HSS.

In step S102, the I-CSCF obtains information of a second S-CSCF. The I-CSCF obtains the information of the second S-CSCF by requesting, from the HSS, the name or capability set of the S-CSCF again. After the I-CSCF receives the failure response, again, the I-CSCF requests, from the HSS, the name or capability set of the S-CSCF.

The I-CSCF may request, from the HSS, the name or capability set of the S-CSCF again when the failure response carries the information indicating that another S-CSCF different from the first S-CSCF has been assigned to the user.

In step S103, the I-CSCF forwards the service request from the user to the second S-CSCF according to the name of the second S-CSCF returned by the HSS. After the I-CSCF forwards the service request from the user to the second S-CSCF, the second S-CSCF requests, from the HSS, the subscription data of the user, and then normally processes the service request of the user according to the subscription data of the user returned by the HSS.

Additionally, when multiple identities of the user simultaneously generate unregistered services, when they generate registration requests at the time of generating unregistered services, or when they simultaneously generate registration requests, after the HSS returns the capability set of the S-CSCF to the I-CSCF, the HSS may set a mark of selection of S-CSCF being made, and also set and start a timer at the same time. After the HSS receives the request message of the S-CSCF selected by the I-CSCF for the user, e.g., service assignment request (SAR) or multimedia authenticate request (MAR) message, and saves the name of the S-CSCF or after the timer times out, the HSS clears the mark of selection of S-CSCF being made and the timer. If the HSS receives a request message requesting the capability set or name of the S-CSCF for the same user sent by the I-CSCF or another I-CSCF that is different from the I-CSCF after the HSS sets the mark of selection of S-CSCF being made, the HSS will not return the capability set to the I-CSCF immediately if the mark of selection of S-CSCF being made exists. Instead, the HSS returns the name of the S-CSCF to the I-CSCF after it saves the name of the S-CSCF or the timer times out.

If the HSS receives the request message requesting the capability set or name of the S-CSCF for the same user sent by the I-CSCF or another I-CSCF different from the I-CSCF after the HSS sets the mark of selection of S-CSCF being made, the HSS returns an error response message to the I-CSCF or said another I-CSCF different from the I-CSCF to inform the I-CSCF or said another I-CSCF different from the I-CSCF that the HSS is making an S-CSCF selection; or After a predetermined period of time, the I-CSCF or the other I-CSCF different from the I-CSCF again sends a request message requesting the capability set or name of the S-CSCF to the HSS; or The I-CSCF or the other I-CSCF different from the I-CSCF instructs the initiation service requester to initiate the service request again after a predetermined period of time.

Figure 2A:
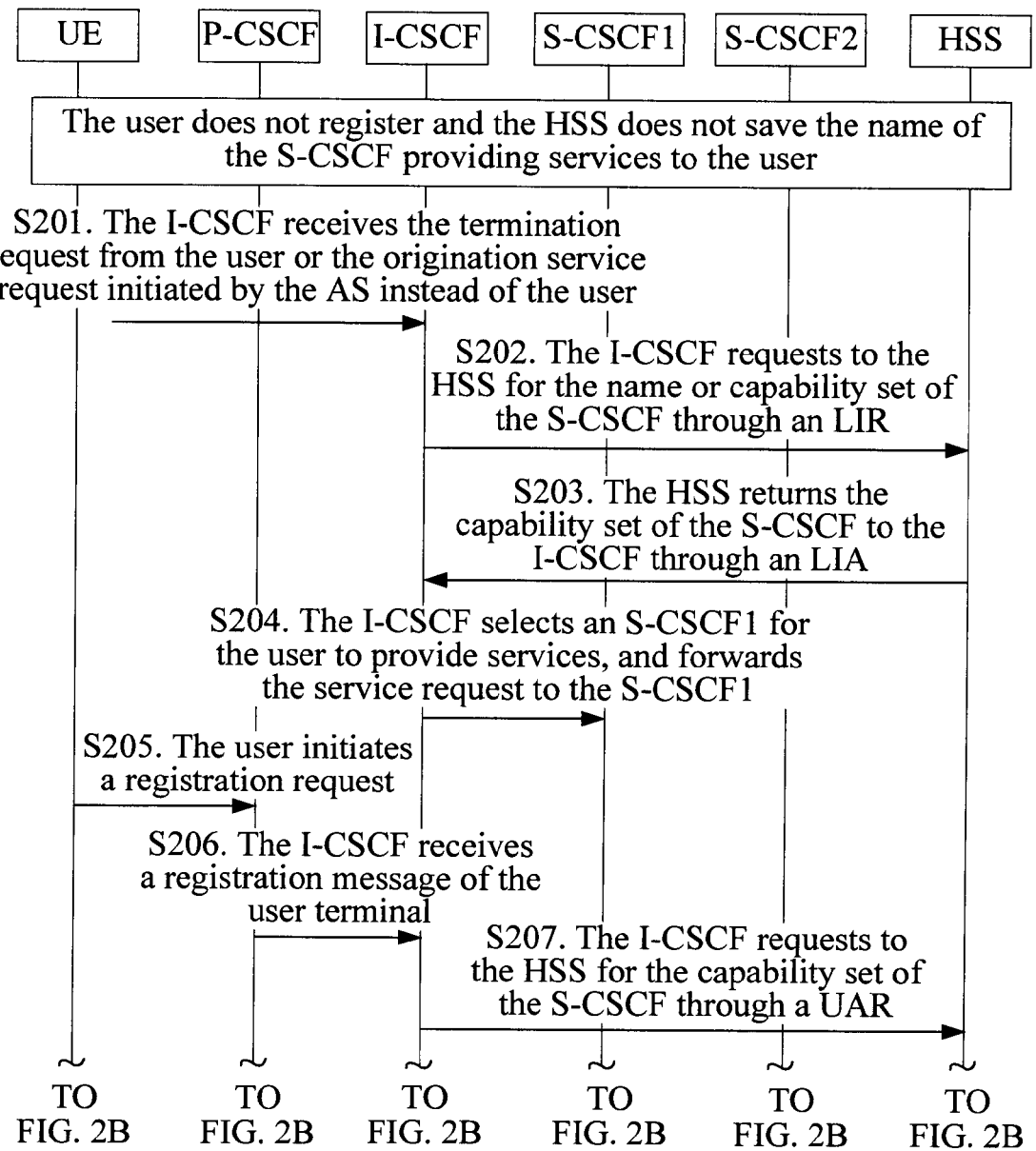
FIG. 2 is a flow chart of a method for providing services for a user according to a first embodiment of the present invention.
Figure 2B:
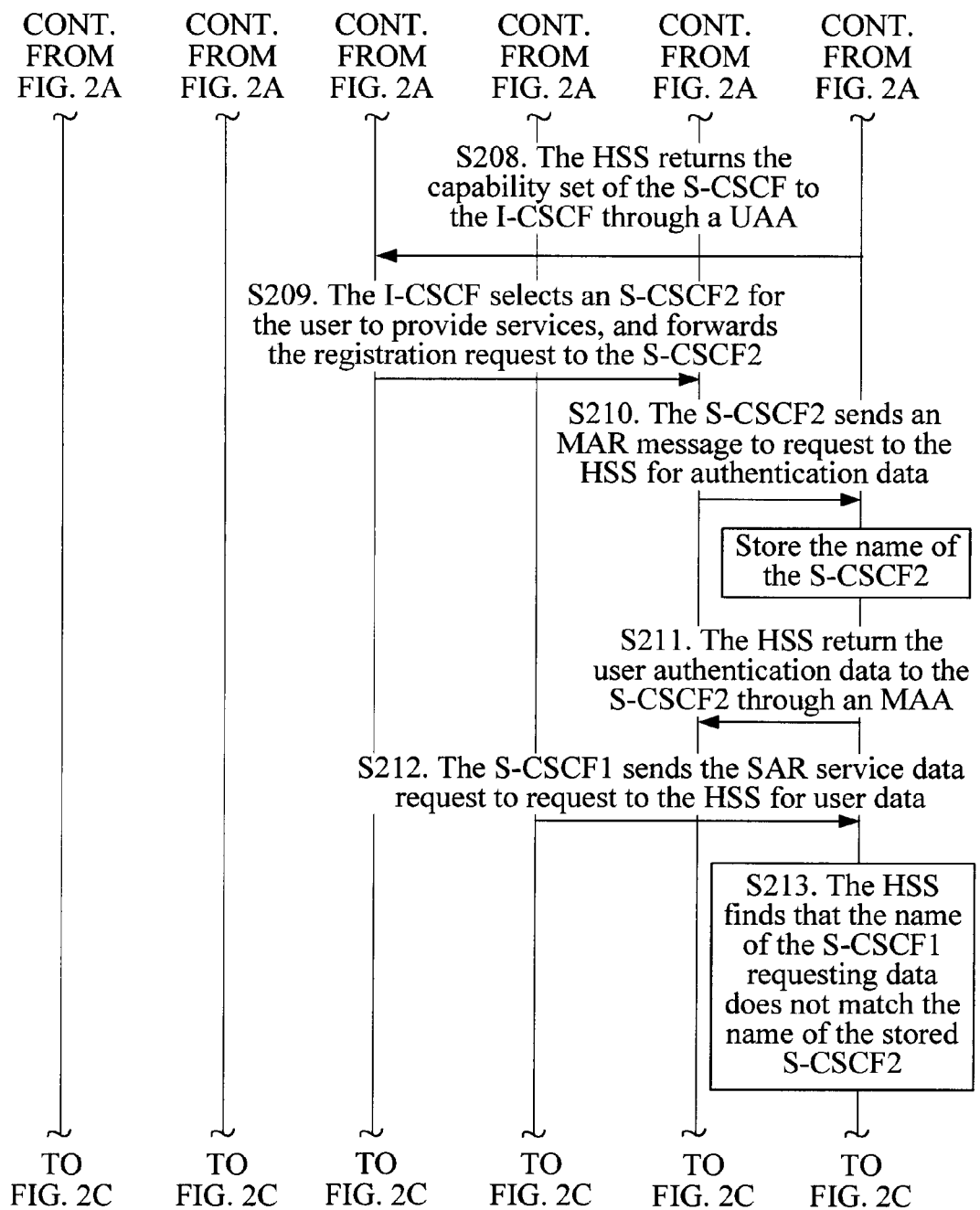
Figure 2C:
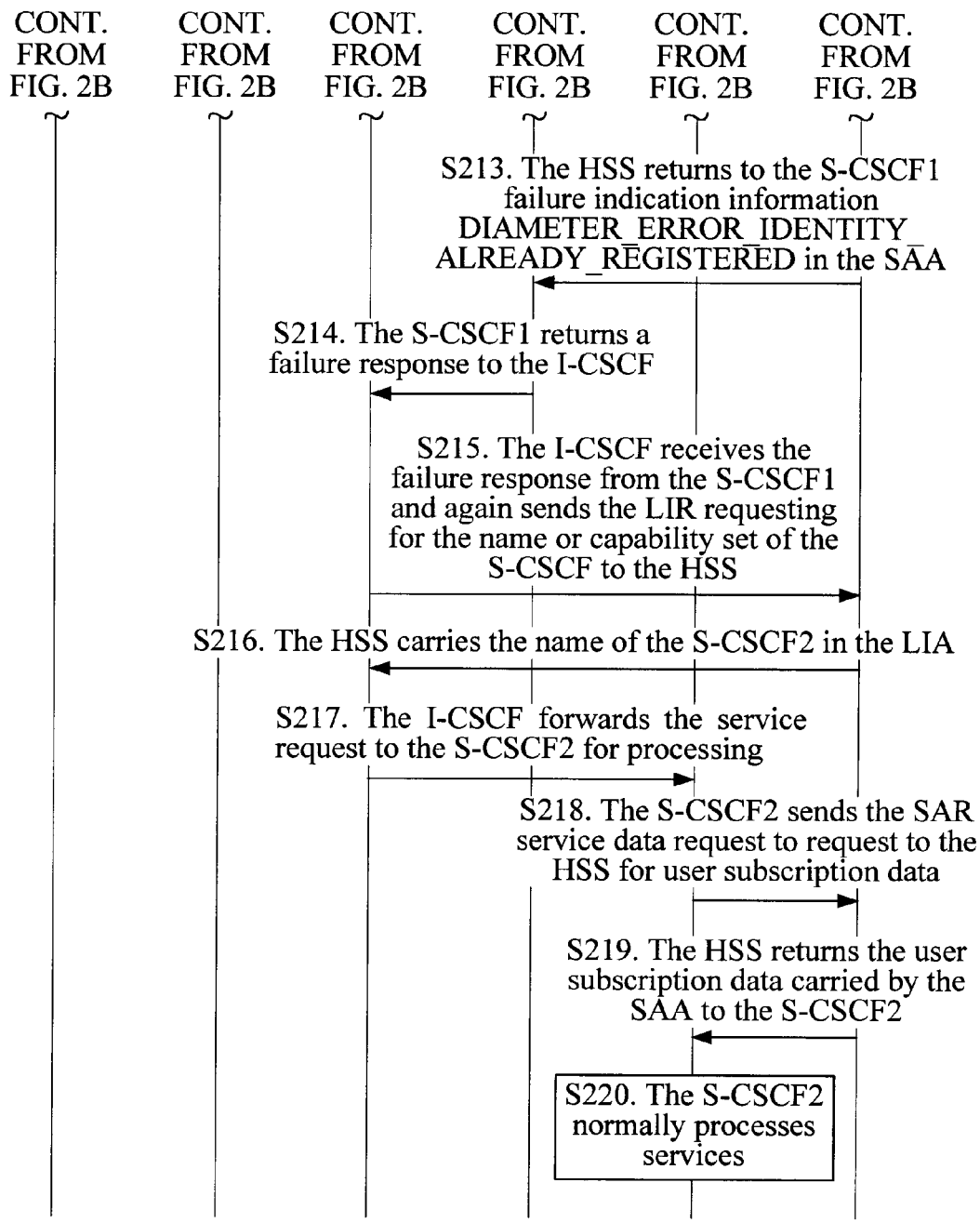

Referring to in FIG. 2, a flow chart of a method for providing services for a user according to a first embodiment of the present invention is shown. In the first embodiment, the user does not register with the network, and there is no name of the S-CSCF providing services for the user stored in the HSS. When the user has an unregistered termination request or an unregistered initiation request initiated by an AS instead of the user and a registration request, if the I-CSCF receives a failure response of the S-CSCF selected for providing unregistered services for the user, the I-CSCF again requests, from the HSS, the name of the S-CSCF, thereby enabling the unregistered services to be provided for the user to avoid call lost.

Specifically, the method includes the following steps.

In step S201, the I-CSCF receives a termination request from the user, or an initiation service request initiated by the AS instead of the user.

In step S202, the I-CSCF requests, from the HSS, the name or capability set of the S-CSCF through a location information request (LIR).

In step S203, if the user has services in the unregistered state or it is indicated that the request is an initiation request, the HSS returns the capability set of the S-CSCF to the I-CSCF through a location information answer (LIA).

In step S204, the I-CSCF selects an S-CSCF1 for the user to provide services, and forwards the service request to the S-CSCF1.

In step S205, before the HSS processes SAR service data request of the S-CSCF1, the user initiates a registration request, in which the SAR service data request enables the HSS to store the name of the S-CSCF1. The user may be another user identity under the same IMS subscription.

In step S206, the I-CSCF receives the registration message of the user terminal.

In step S207, the I-CSCF requests, from the HSS, the capability set of the S-CSCF through a user authorization request (UAR).

In step S208, the HSS returns the capability set of the S-CSCF to the I-CSCF through a user authorization answer (UAA).

In step S209, the I-CSCF selects an S-CSCF2 for the user to provide services, and forwards the registration request to the S-CSCF2.

In step S210, the S-CSCF2 sends an MAR message to request, from the HSS, authentication data.

In step S211, if the S-CSCF1 has not sent the SAR service data request to request, from the HSS, user data, and the HSS has not saved the name of the S-CSCF1, the HSS stores the name of the S-CSCF2 and returns the user authentication data to the S-CSCF2 through a multimedia authenticate answer (MAA) message; or If the S-CSCF1 has already sent the SAR service data request to request, from the HSS, user data, and the HSS has saved the name of the S-CSCF1, the name of the S-CSCF1 is overwritten as S-CSCF2, and the HSS initiates a network logout request to the S-CSCF1 to release the session established by the S-CSCF1.

In step S212, the S-CSCF1 sends the SAR service data request to request, from the HSS, user data.

In step S213, the HSS finds that the S-CSCF2 has been stored and the name of the S-CSCF2 does not match the name of the S-CSCF1 sending the request. The HSS returns indication information DIAMETER_ERROR_IDENTITY_ALREADY_REGISTERED to the S-CSCF1 in a server assignment answer (SAA).

In step S214, the S-CSCF1 returns to the I-CSCF a failure response representing that the user cannot be provided with unregistered services.

In step S215, the I-CSCF receives the failure response from the S-CSCF1 and again sends the LIR requesting the name or capability set of the S-CSCF to the HSS.

The I-CSCF may send the LIR to the HSS again until the failure response returned by the S-CSCF1 expressly indicates that another S-CSCF has already been assigned to the user.

In step S216, the HSS carries the name of the S-CSCF2 in the LIA.

In step S217, the I-CSCF forwards the service request to the S-CSCF2 for processing.

In step S218, the S-CSCF2 sends the SAR service data request to request, from the HSS, user subscription data.

In step S219, the HSS returns the user subscription data carried by the SAA to the S-CSCF2.

In step S220, the S-CSCF2 normally processes services.

Figure 3A:
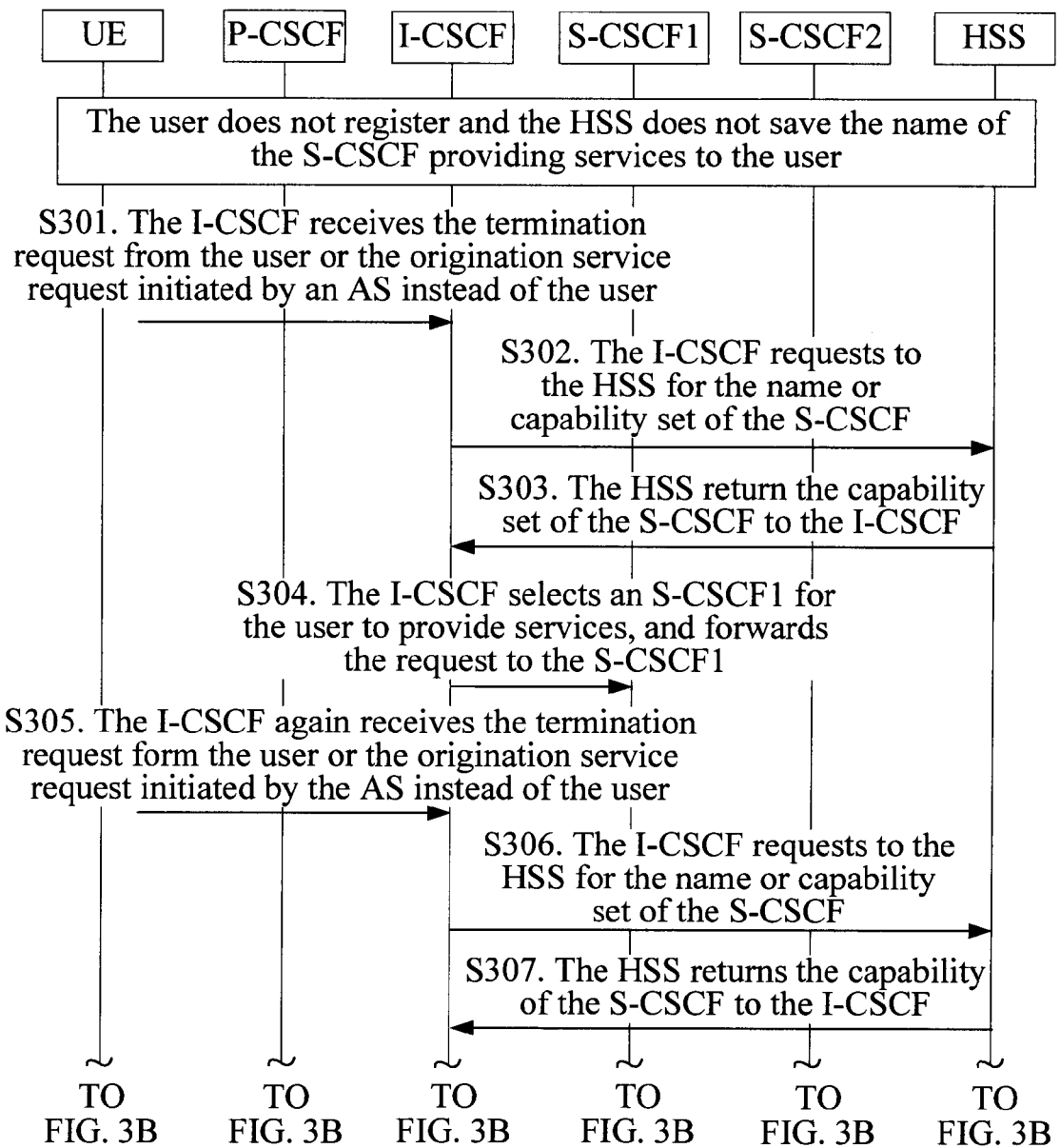
FIG. 3 is a flow chart of a method for providing services for a user according to a second embodiment of the present invention.
Figure 3B:
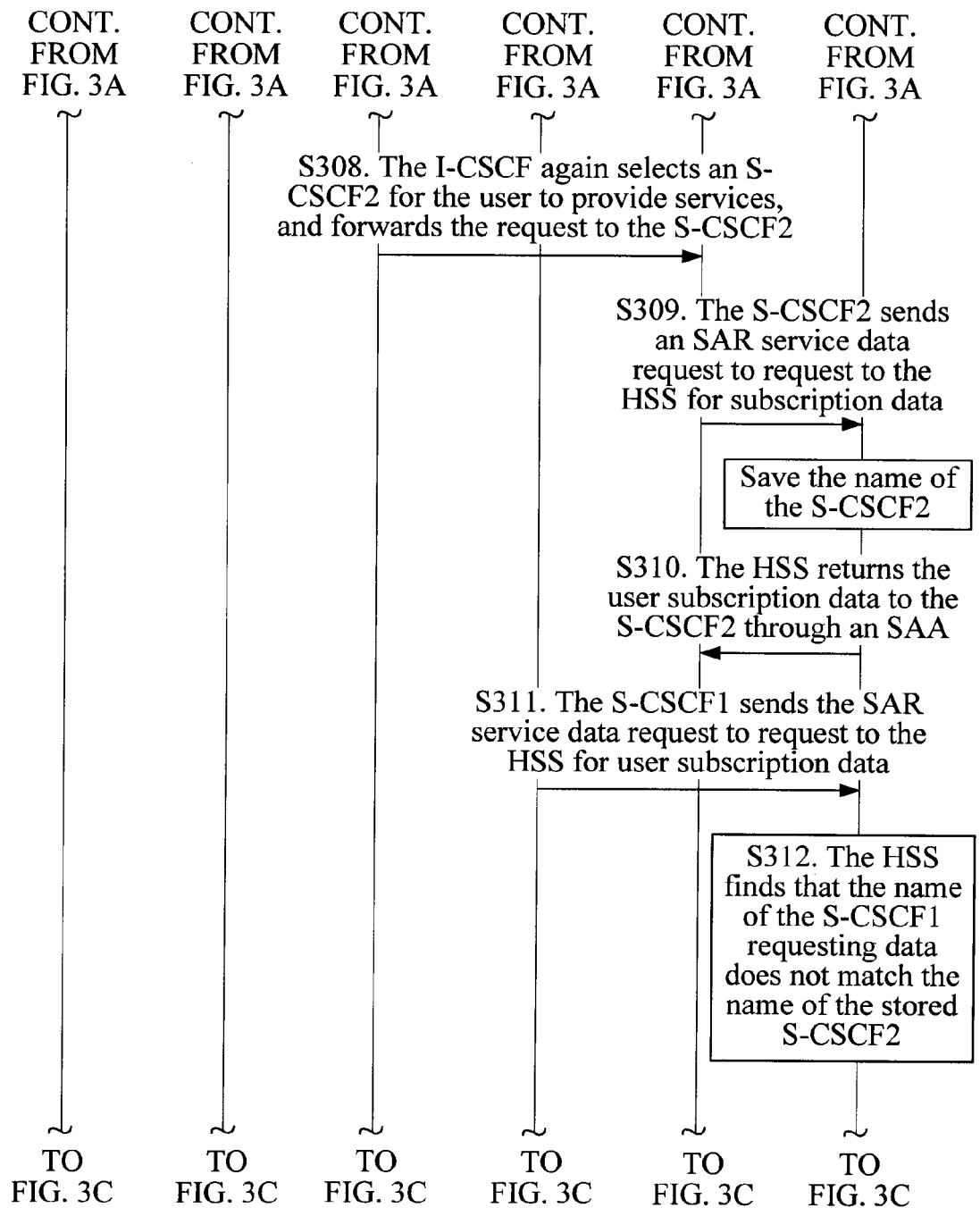
Figure 3C:
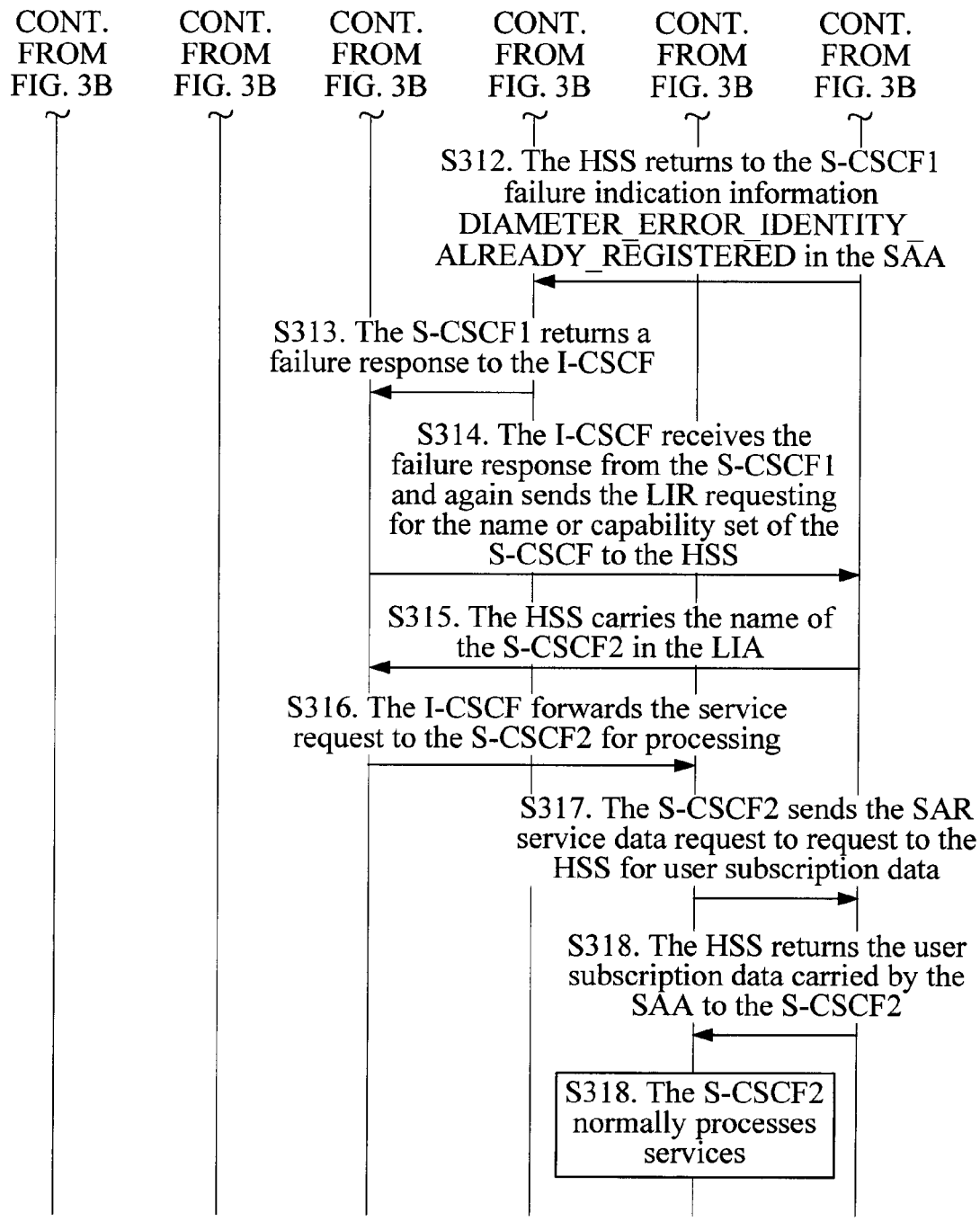

Referring to FIG. 3, a flow chart of a method for providing services for a user according to a second embodiment of the present invention is shown. In the second embodiment, the user does not register with the network, and there is no name of the S-CSCF providing services for the user stored in the HSS. When the user has two or more unregistered termination requests or unregistered initiation requests initiated by the AS instead of the user, if the I-CSCF receives a failure response of one S-CSCF, the I-CSCF again requests, from the HSS, the name of the S-CSCF, thereby enabling the unregistered services to be normally provided for the user to avoid call lost.

In step S301, the I-CSCF receives a termination request from the user, or an initiation service request initiated by the AS instead of the user.

In step S302, the I-CSCF requests, from the HSS, the name or capability set of the S-CSCF.

In step S303, if the user has the services in the unregistered state or it is indicated that the request is an initiation request, the HSS returns the capability set of the S-CSCF to the I-CSCF.

In step S304, the I-CSCF selects an S-CSCF1 for the user to provide services, and forwards the request to the S-CSCF1.

In step S305, before the HSS processes an SAR service data request of the S-CSCF1, the I-CSCF again receives the termination request from the user or the initiation service request initiated by the AS instead of the user. The SAR service data request enables the HSS to store the name of the S-CSCF1, and the user may be another user identity under the same IMS subscription.

In step S306, the I-CSCF requests, from the HSS, the name or capability set of the S-CSCF.

In step S307, the HSS returns the capability set of the S-CSCF to the I-CSCF.

In step S308, the I-CSCF again selects an S-CSCF2 for the user to provide services, and forwards the request to the S-CSCF2.

In step S309, the S-CSCF2 sends the SAR service data request to request, from the HSS, subscription data.

In step S310, if the S-CSCF1 has not sent the SAR service data request to request, from the HSS, user data, and the HSS has not saved the name of the S-CSCF1, the HSS stores the name of the S-CSCF2 and returns the user subscription data to the S-CSCF2 through an SAA.

If the S-CSCF1 has already sent the SAR service data request to request, from the HSS, user data, and the HSS has saved the name of the S-CSCF1, the HSS returns failure indication information DIAMETER_ERROR_IDENTITY_ALREADY_REGISTERED to the S-CSCF2 in the SAA. Thereafter, the S-CSCF2 returns to the I-CSCF a failure response representing that the user cannot be provided with unregistered services. The subsequent processing of the I-CSCF is the same as S314, but it proceeds with pertinence to the failure response of the S-CSCF2.

In step S311, the S-CSCF1 sends the SAR service data request to request, from the HSS, user subscription data.

In step S312, the HSS finds that the S-CSCF2 has been stored and the S-CSCF2 does not match the name of the S-CSCF1 requesting data. The HSS returns the failure indication information DIAMETER_ERROR_IDENTITY_ALREADY_REGISTERED to the S-CSCF1 in the SAA.

In step S313, the S-CSCF1 returns to the I-CSCF a failure response representing that the user cannot be provided with unregistered services.

In step S314, the I-CSCF receives the failure response from the S-CSCF1 and again sends the LIR requesting the name or capability set of the S-CSCF to the HSS.

The I-CSCF may send the LIR to the HSS again until the failure response returned by the S-CSCF1 expressly indicates that another S-CSCF has already been assigned to the user.

In step S315, the HSS carries the name of the S-CSCF2 in the LIA.

In step S316, the I-CSCF forwards the service request to the S-CSCF2 for processing.

In step S317, the S-CSCF2 sends the SAR service data request to request, from the HSS, user subscription data.

In step S318, the HSS returns the user subscription data carried by the SAA to the S-CSCF2. Thereafter, the S-CSCF2 normally processes services.

With the method for providing services, the network may normally provide corresponding services for a user in the case that the user simultaneously generates multiple unregistered services or generates a registration request at the time of generating unregistered services.

Figure 4A:
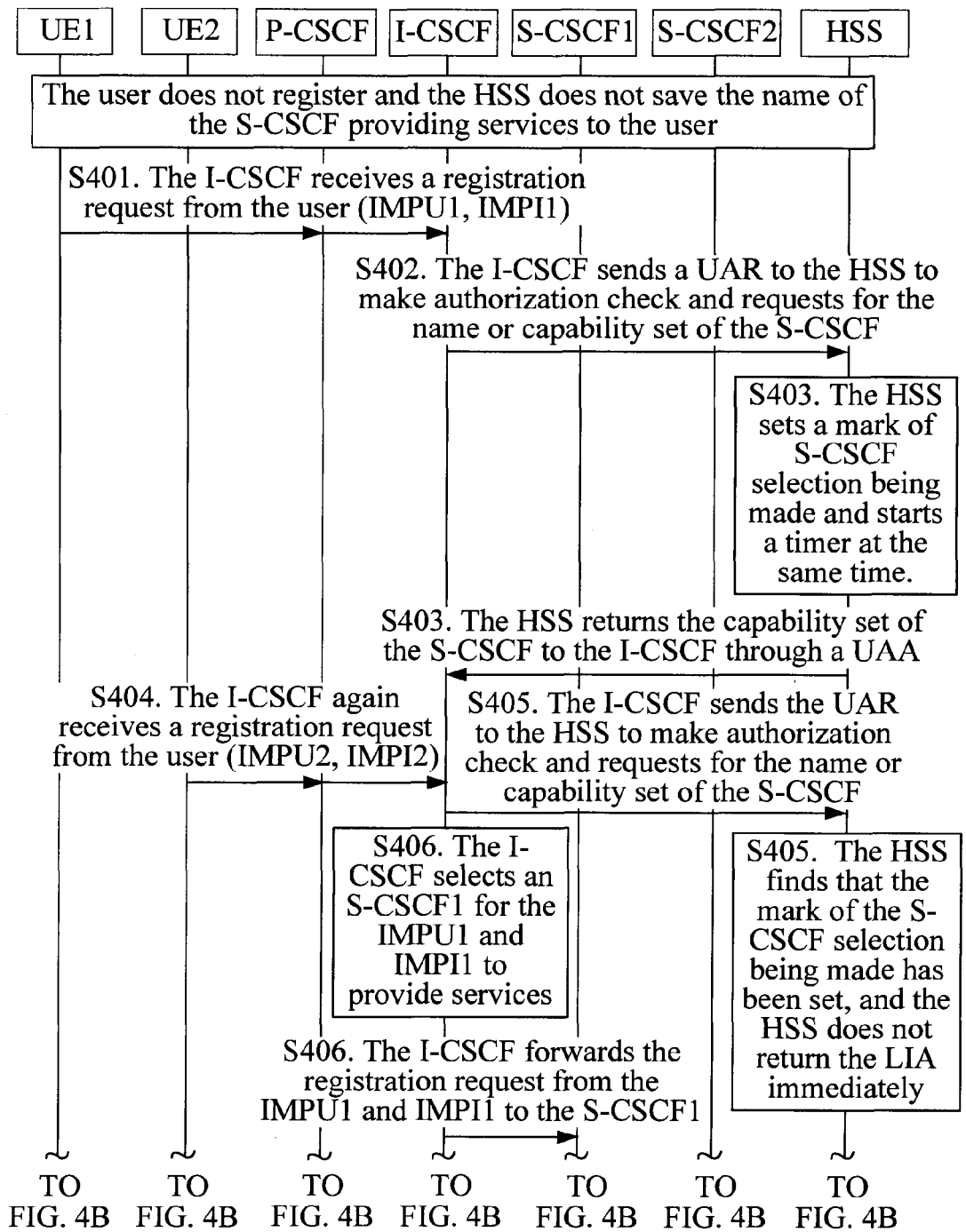
FIG. 4 is a flow chart of a method for providing services for a user according to a third embodiment of the present invention.
Figure 4B:
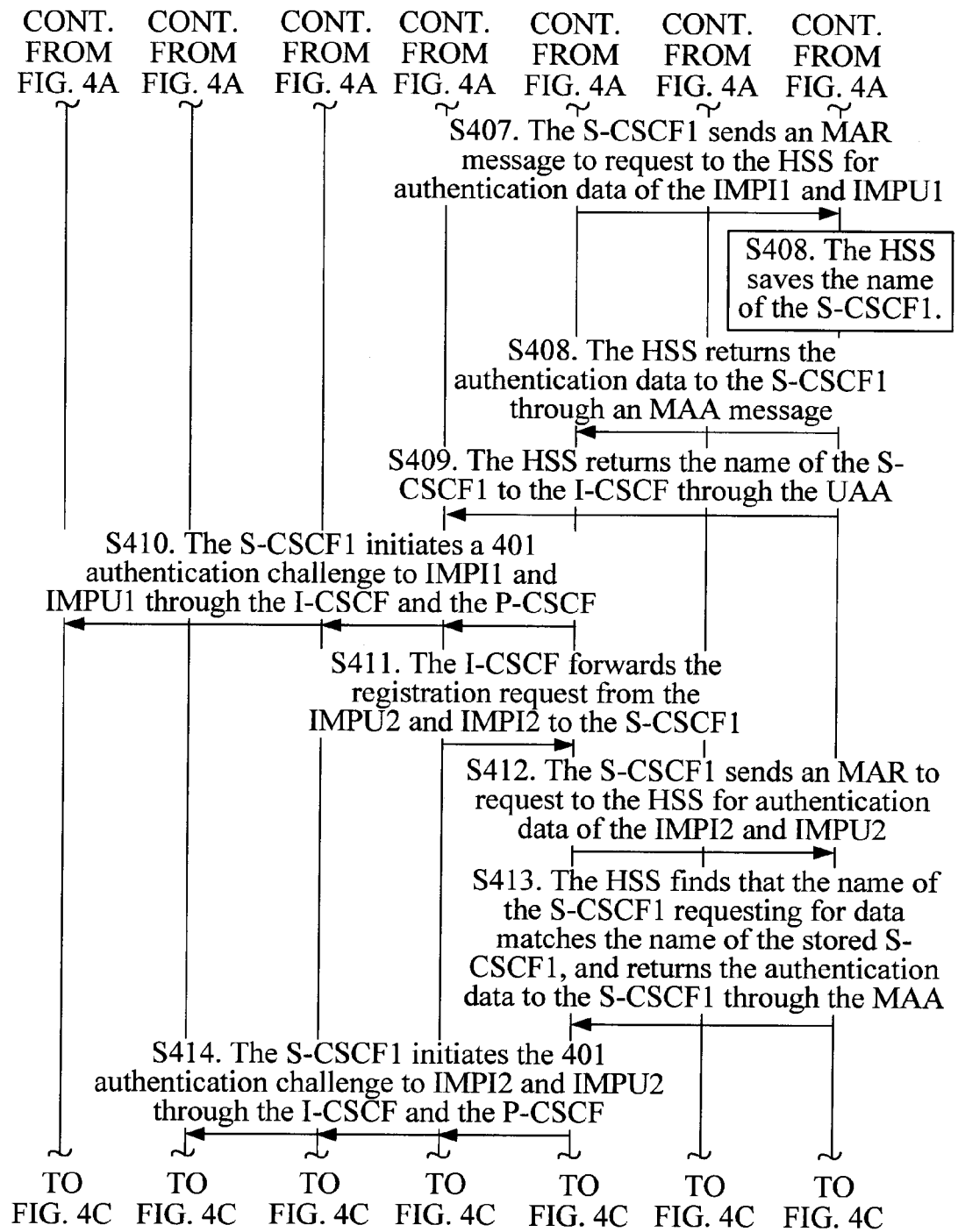
Figure 4C:
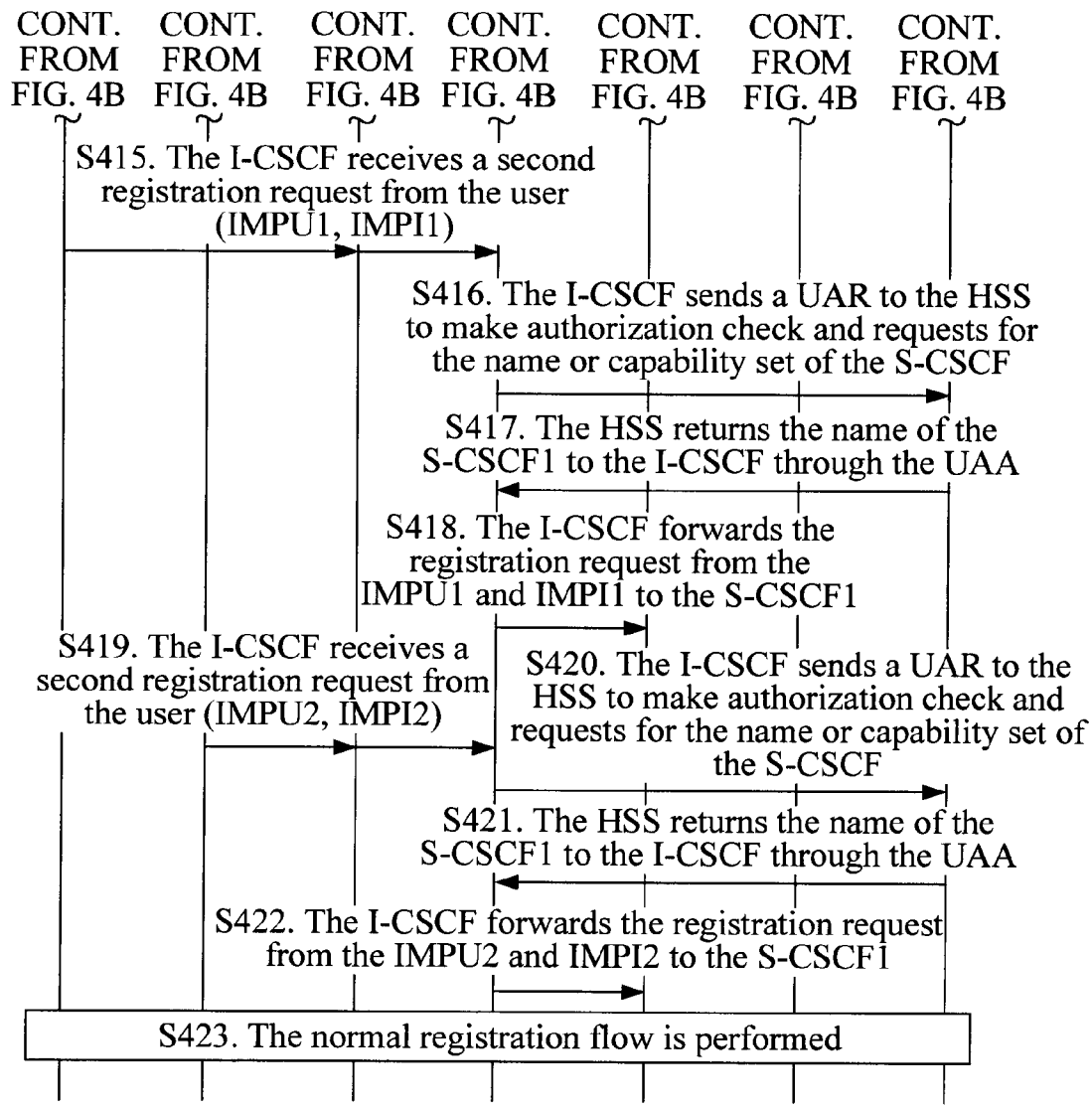

Referring to FIG. 4, a flow chart of a method for providing services for a user according to a third embodiment of the present invention is shown. When multiple identities of the user simultaneously generate unregistered services, when they generate registration requests at the time of generating unregistered services, or when they simultaneously generate registrations, after the HSS receives from the I-CSCF a first request message requesting the capability set of the S-CSCF and the capability set of the S-CSCF is carried in a first request response message, the HSS can set a mark of S-CSCF selection being made, and start a timer at the same time. Until the HSS receives the SAR services data request or MAR message of the S-CSCF selected for the user and saves the name of the S-CSCF, or the timer times out, the HSS clears the mark and the timer. If the HSS receives from the I-CSCF a second request message requesting the capability set of the S-CSCF, that is, another service request from the user is received, before the HSS saves the name of the S-CSCF, the HSS will not return LIA immediately if the mark exists. Until the HSS receives the SAR services data request or MAR message of the S-CSCF selected for the user and saves the name of the S-CSCF, the HSS returns the name of the S-CSCF to the I-CSCF through the LIA, so as to solve the problem that may occur when a user is simultaneously assigned with two S-CSCFs. If the HSS has not received the SAR service data request or the MAR message of the S-CSCF when the timer times out, the HSS returns the capability set of the S-CSCF to the I-CSCF for subsequent processing.

When the HSS receives the second request message requesting the capability set of the S-CSCF, it may also select to return a particular error code to the I-CSCF, so as to indicate that the S-CSCF selection is being made. The I-CSCF may again send a request message requesting the capability set of the S-CSCF after a certain period of time, and may also directly return errors to a service initiator, so as to instruct the service initiator to again initiate service requests after a certain period of time.

The error code may also further carry an expected completion time of the last S-CSCF selection for the user or a time used to indicate when to initiate a request again. After the I-CSCF receives the error response, it again sends the request message requesting the capability set or name of the S-CSCF to the HSS after a predetermined period of time according to the expected completion time of the last S-CSCF selection for the user or the time used to indicate when to initiate a request again. Alternatively, the I-CSCF instructs the user to initiate the service request again after the predetermined period of time.

In the third embodiment, the user does not register with the network and there is no name of the S-CSCF providing services for the user stored in the HSS. While two or more terminals of the user simultaneously register, the HSS is able to normally provide the user with registration services through the above manner of setting the mark of S-CSCF selection being made, thus avoiding call lost. Specifically, the method includes the following steps.

In step S401, the I-CSCF receives a registration request from the user (IMPU1, IMPI1).

In step S402, the I-CSCF sends a UAR to the HSS to make authorization check and sends a first request message requesting the name or capability set of the S-CSCF.

In step S403, the HSS sets a mark of S-CSCF selection being made and starts a timer at the same time, and then returns the capability set of the S-CSCF to the I-CSCF through a UAA.

In step S404, the I-CSCF again receives a registration request from the user (IMPU2, IMPI2);

In step S405, the I-CSCF sends a UAR to the HSS to make authorization check and requests, from the HSS, the name or capability set of the S-CSCF. If the HSS finds that the mark of S-CSCF selection being made has been set, the HSS will not return an LIA immediately.

In step S406, the I-CSCF selects an S-CSCF1 for the IMPU1 and IMPI1 to provide services, and forwards the registration request from the IMPU1 and IMPI1 to the S-CSCF1.

In step S407, the S-CSCF1 sends an MAR message to request, from the HSS, authentication data of the IMPI1 and IMPU1.

In step S408, the HSS saves the name of the S-CSCF1 and returns the authentication data to the S-CSCF1 through an MAA message.

In step S409, the HSS returns the name of the S-CSCF1 to the I-CSCF through the UAA.

In step S410, the S-CSCF1 initiates a 401 authentication challenge to the IMPI1 and
IMPU1 through the I-CSCF and the P-CSCF.

In step S411, the I-CSCF forwards the registration request from the IMPU2 and IMPI2 to the S-CSCF1.

In step S412, the S-CSCF1 sends an MAR to request, from the HSS, authentication data of the IMPI2 and IMPU2.

In step S413, the HSS finds that the name of the S-CSCF1 requesting data matches the name of the stored S-CSCF1, and returns the authentication data to the S-CSCF1 through the MAA.

In step S414, the S-CSCF1 initiates the 401 authentication challenge to the IMPI2 and IMPU2 through the I-CSCF and the P-CSCF.

In step S415, the I-CSCF receives a second registration request from the user (IMPU1, IMPI1).

In step S416, the I-CSCF sends the UAR to the HSS to make authorization check and requests, from the HSS, the name or capability set of the S-CSCF.

In step S417, the HSS returns the name of the S-CSCF1 to the I-CSCF through the UAA.

In step S418, the I-CSCF forwards the registration request from the IMPU1 and IMPI1 to the S-CSCF1.

In step S419, the I-CSCF receives a second registration request from the user (IMPU2, IMPI2).

In step S420, the I-CSCF sends the UAR to the HSS to make authorization check and requests, from the HSS, the name or capability set of the S-CSCF.

In step S421, the HSS returns the name of the S-CSCF1 to the I-CSCF through the UAA.

In step S422, the I-CSCF forwards the registration request from the IMPU2 and IMPI2 to the S-CSCF1.

In step S423, a normal registration flow is performed.

Figure 7:
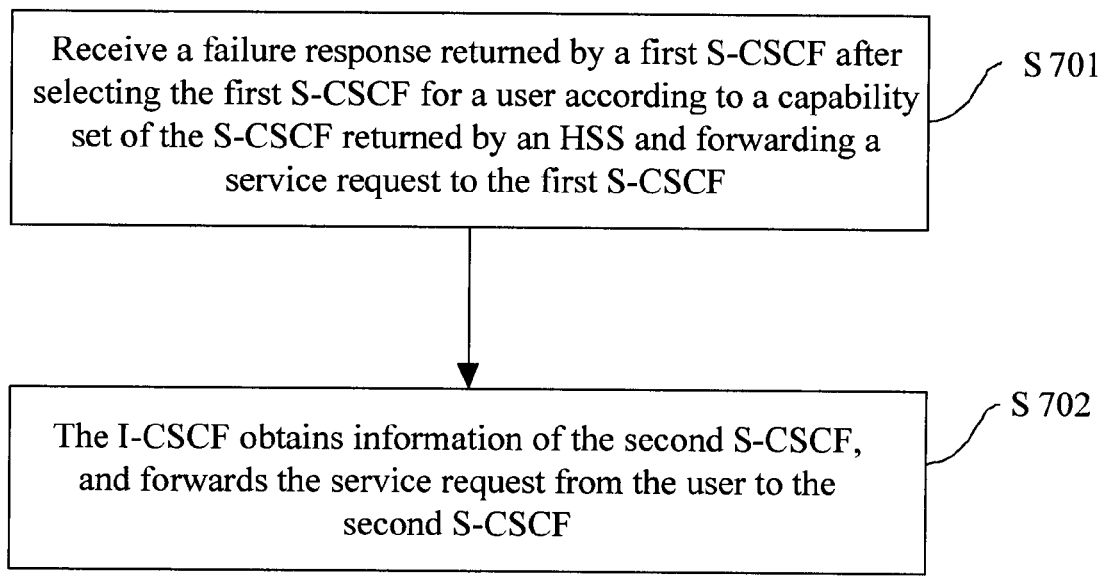
FIG. 7 is a flow chart of a method for providing services for a user according to a fourth embodiment of the present invention.

Referring to FIG. 7, a flow chart of a method for providing services for a user according to a fourth embodiment of the present invention is shown, and the method includes the following steps.

In step S701, a failure response returned by a first S-CSCF is received after selecting the first S-CSCF for a user according to a capability set of the S-CSCF returned by an HSS and forwarding a service request to the first S-CSCF. The failure response carries the name of a second S-CSCF.

Before a first S-CSCF returns the failure response to the I-CSCF, the first S-CSCF receives the service request forwarded by the I-CSCF and requests, from the HSS, the subscription data of the user. The first S-CSCF is selected by the I-CSCF according to the capability set of the S-CSCF returned by the HSS.

When the first S-CSCF requests, from the HSS, the subscription data of the user, if the HSS finds that the name of the first S-CSCF is not the same as the stored name of the S-CSCF assigned to the user, it returns failure indication information to the first S-CSCF, which indicates that another S-CSCF different from the first S-CSCF has already been assigned to the user. Then, the first S-CSCF sends a failure response carrying the name of a second S-CSCF to the I-CSCF according to the failure indication information returned by the HSS.

In step S702, the I-CSCF obtains information of the second S-CSCF from the failure response, that is, the I-CSCF forwards the service request from the user to the second S-CSCF according to the name of the second S-CSCF carried by the failure response returned by the first S-CSCF.

After the I-CSCF forwards the service request from the user to the second S-CSCF, the second S-CSCF requests, from the HSS, the subscription data of the user. Then, the I-CSCF normally processes the service request of the user according to the subscription data of the user returned by the HSS.

Figure 8A:
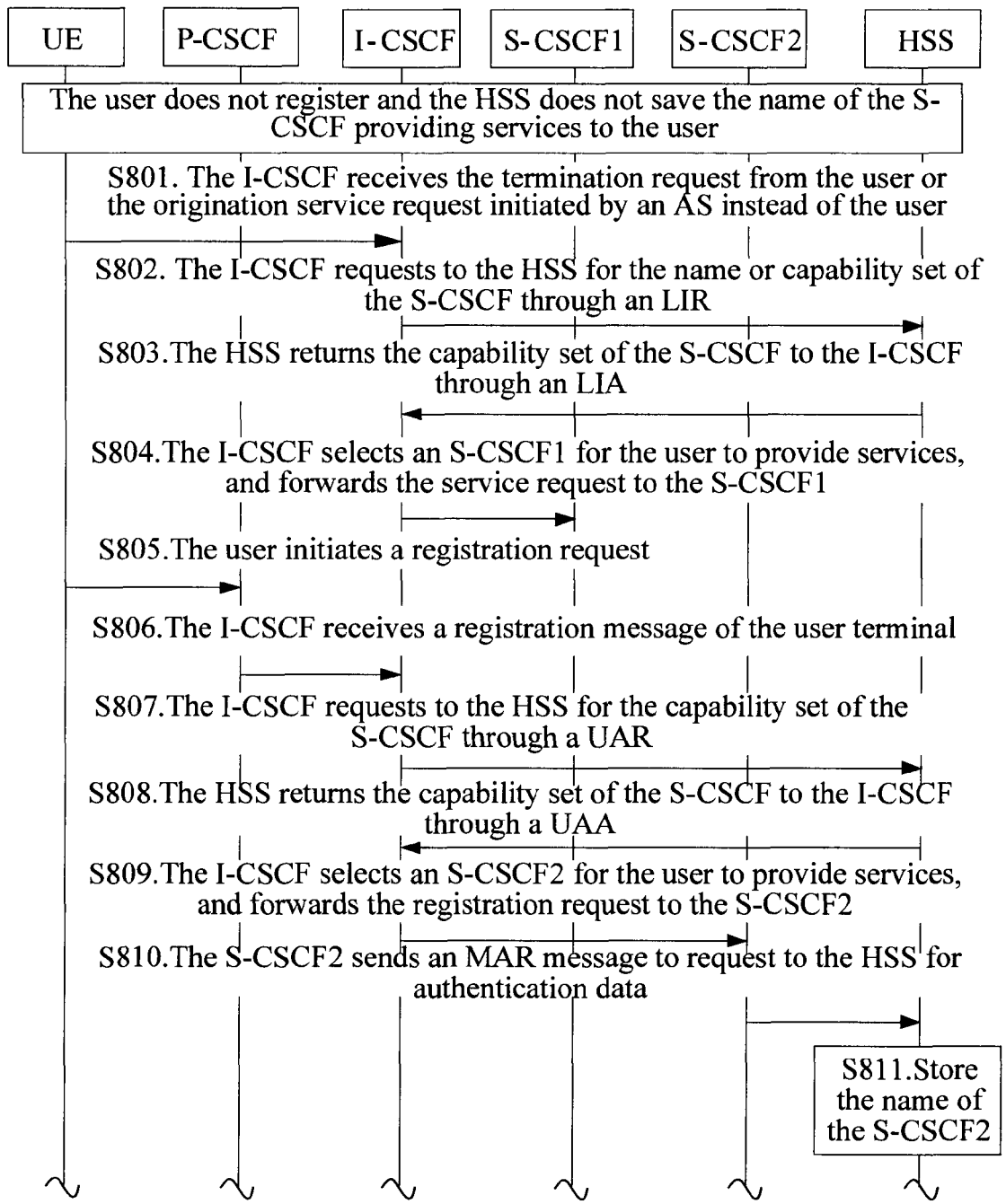
FIG. 8 is a flow chart of a method for providing services for a user according to a fifth embodiment of the present invention.
Figure 8B:
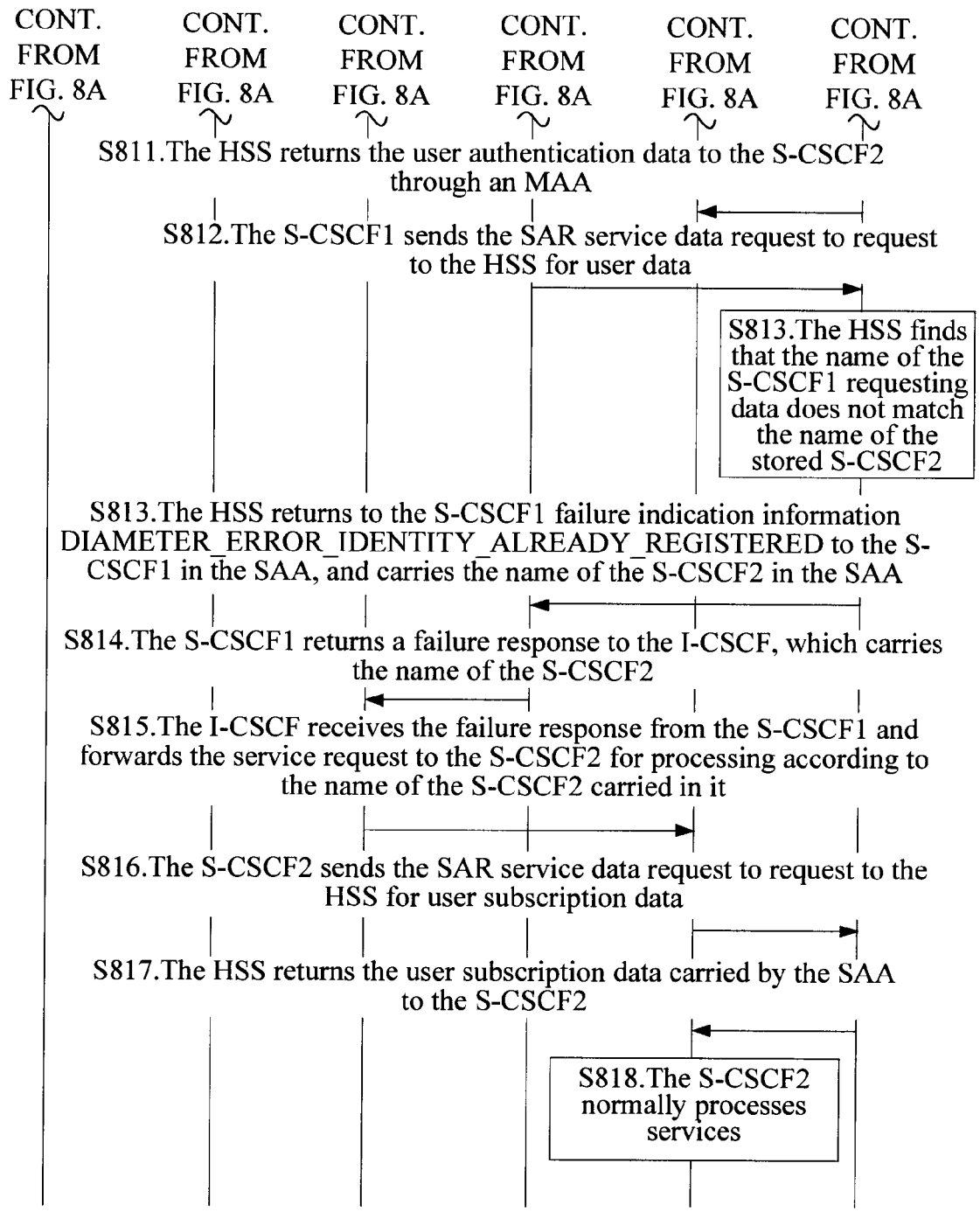

Referring to FIG. 8, a flow chart of a method for providing services for a user according to a fifth embodiment of the present invention is shown. In the fifth embodiment, the user does not register with the network and there is no name of the S-CSCF providing services for the user stored in the HSS. When the user has an unregistered termination request or an unregistered initiation request initiated by an AS instead of the user and a registration request, if the I-CSCF receives the failure response of the S-CSCF selected for providing unregistered services for the user, the I-CSCF sends the service request to the S-CSCF according to the name of the S-CSCF currently providing services for the user and carried by the failure response, thereby enabling the unregistered services to be provided for the user to avoid call lost. Specifically, the method includes the following steps.

In step S801, the I-CSCF receives a termination request from the user or an initiation service request initiated by AS instead of the user.

In step S802, the I-CSCF requests, from the HSS, the name or capability set of the S-CSCF through an LIR.

In step S803, if the user has the services in the unregistered state or it is indicated that the request is an initiation request, the HSS will return the capability set of the S-CSCF to the I-CSCF through an LIA.

In step S804, the I-CSCF selects an S-CSCF1 for the user to provide services, and forwards the service request to the S-CSCF1.

In step S805, before the HSS processes an SAR service data request of the S-CSCF1, the user initiates a registration request. The SAR service data request enables the HSS to store the name of the S-CSCF1, and the user may be another user identity under the same IMS subscription.

In step S806, the I-CSCF receives a registration message of the user terminal.

In step S807, the I-CSCF requests, from the HSS, the capability set of the S-CSCF through a UAR.

In step S808, the HSS returns the capability set of the S-CSCF to the I-CSCF through a UAA.

In step S809, the I-CSCF selects an S-CSCF2 for the user to provide services, and forwards the registration request to the S-CSCF2.

In step S810, the S-CSCF2 sends an MAR message to request, from the HSS, authentication data.

In step S811, if the S-CSCF1 has not sent the SAR service data request to request, from the HSS, user data, and the HSS has not saved the name of the S-CSCF1, the HSS stores the name of the S-CSCF2 and return the user authentication data to the S-CSCF2 through an MAA message; or If the S-CSCF1 has already sent the SAR service data request to request, from the HSS, user data, and the HSS has saved the name of the S-CSCF1, the name of the S-CSCF1 is overwritten as S-CSCF2, and the HSS initiates a network logout request to the S-CSCF1 to release the session established by the S-CSCF1.

In step S812, the S-CSCF1 sends the SAR service data request to request, from the HSS, user data.

In step S813, the HSS finds that the S-CSCF2 has been stored and the S-CSCF2 does not match the name of the S-CSCF1 requesting data. The HSS returns failure indication information DIAMETER_ERROR_IDENTITY_ALREADY_REGISTERED that carries the name of the S-CSCF2 to the S-CSCF1 in an SAA.

In step S814, the S-CSCF1 returns to the I-CSCF a failure response representing that the user cannot be provided with unregistered services, and the failure response carries the information of the S-CSCF2.

In step S815, the I-CSCF receives the failure response from the S-CSCF1 and forwards the service request to the S-CSCF2 for processing according to the information therein.

In step S816, the S-CSCF2 sends the SAR service data request to request, from the HSS, user subscription data.

In step S817, the HSS returns the user subscription data carried by the SAA to the S-CSCF2.

In step S818, the S-CSCF2 normally processes services.

With the method for providing services for a user, when multiple identities of the user simultaneously generate multiple unregistered services or generate registration requests at the time of generating unregistered services, the network is able to normally provide corresponding services for the user, and furthermore, when multiple identities of the user simultaneously register, the method can still solve the problem of assigning multiple S-CSCFs to one user to normally provide services for the user.

Figure 5:
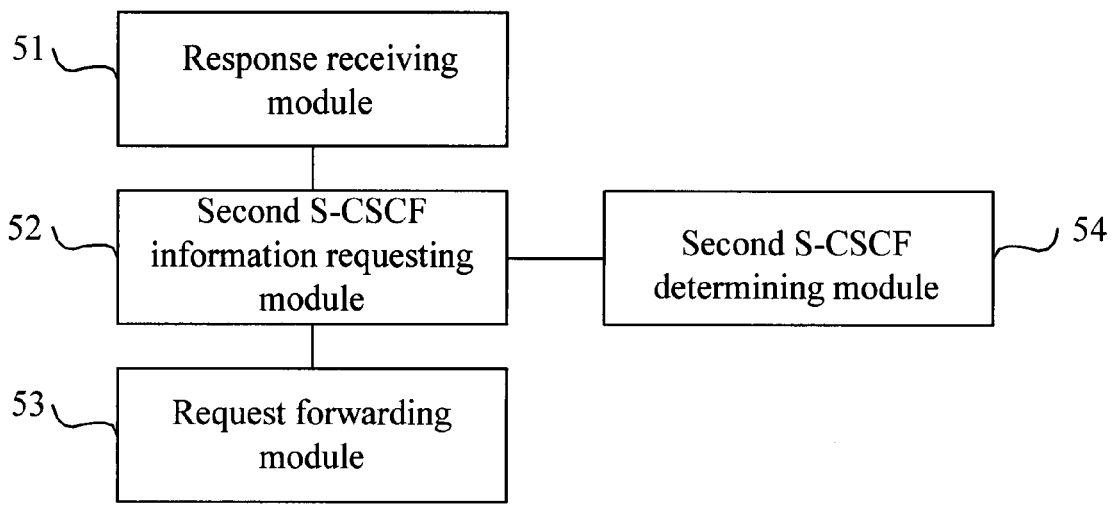
FIG. 5 is a structural view of a device for providing services for a user according to a first embodiment of the present invention.

Referring to FIG. 5, a structural view of a device for providing services for a user according to an embodiment of the present invention is shown. The device is adapted to receive a failure response returned by a first S-CSCF entity after selecting a first S-CSCF for the user according to a capability set of S-CSCF returned by the HSS and forwarding a service request to the first S-CSCF, to again request, from the HSS entity, the name or capability set of the S-CSCF, and to forward the service request from the user to a second S-CSCF entity. The device can be an I-CSCF entity.

The device for providing services for a user includes a response receiving module 51, a second S-CSCF information requesting module 52, and a request forwarding module 53. The response receiving module 51 is adapted to receive the failure response returned by the first S-CSCF entity.

The second S-CSCF information requesting module 52 is adapted to request, from the HSS, the name or capability set of the S-CSCF.

The request forwarding module 53 is adapted to forward the service request from the user to the second S-CSCF entity according to the information of the second S-CSCF returned by the HSS entity.

The response receiving module 51 is further adapted to receive the failure response carrying failure indication information, in which the failure indication information represents that the HSS has assigned another S-CSCF entity different from the first S-CSCF entity to the user.

The second S-CSCF information requesting module 52 is further adapted to again request, from the HSS entity, the name or capability set of the S-CSCF when the failure response received by the response receiving module 51 carries the failure indication information indicating that another S-CSCF entity different from the first S-CSCF entity has been assigned to the user.

The device for providing services for a user further includes a second S-CSCF determining module 54 adapted to determine the second S-CSCF entity according to the name or capability set of the second S-CSCF entity obtained by the second S-CSCF information requesting module 52.

Figure 6:
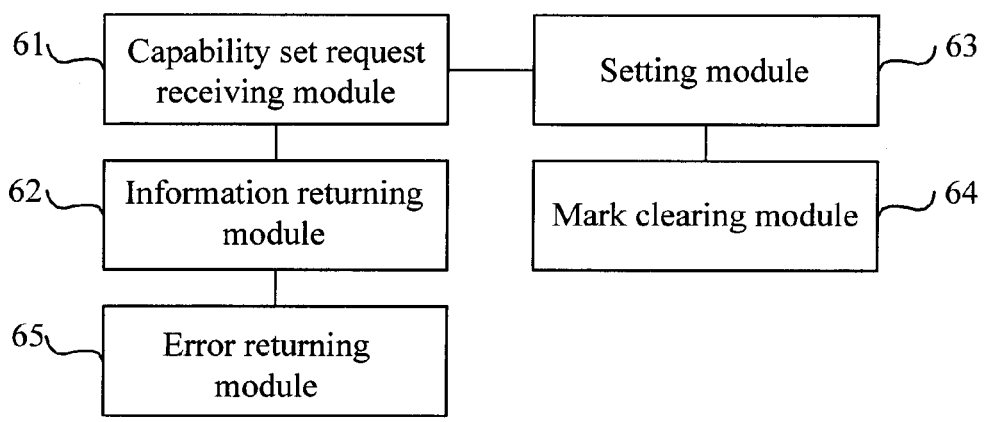
FIG. 6 is a structural view of a device for providing services for a user according to a second embodiment of the present invention.

Referring to FIG. 6, a structural view of an HSS entity according to an embodiment of the present invention is shown. The device includes a capability set request receiving module 61 and an information returning module 62. The capability set request receiving module 61 is adapted to receive a request for requesting the capability set of the S-CSCF providing services to a second identity of the user; receive request message requesting the capability set of the S-CSCF providing services to a first identity of the user or the name of the S-CSCF, and return the capability set of the S-CSCF providing services to a first identity of the user or the name of the S-CSCF.

The information returning module 62 is adapted to return the capability set or name of the S-CSCF to the I-CSCF before the HSS determines that a last S-CSCF selection has finished or the last S-CSCF selection has been overtime, in which the last S-CSCF selection refers to the selection of the S-CSCF for the first identity of the user.

The HSS entity further includes a setting module 63 adapted to set a mark of the S-CSCF entity selection being made or set a timer and start timing, after the capability set request receiving module 61 receives the request for the capability set of the S-CSCF providing services to the first identity of the user sent by the I-CSCF.

The HSS entity further includes a mark clearing module 64 adapted to clear the mark of the S-CSCF selection being made or clear the timer when the information returning module determines that the selection of the S-CSCF for the first identity of the user has finished or been overtime.

The HSS entity further includes an error returning module 65 adapted to, when the HSS determines that the last S-CSCF selection has finished or the last S-CSCF selection has not been overtime, return an error response message to the I-CSCF entity or another I-CSCF entity different from the I-CSCF entity to inform the I-CSCF entity or said another I-CSCF entity different from the I-CSCF entity that the S-CSCF entity selection is being made after the HSS again receives the request message requesting the capability set or name of the S-CSCF for the same user sent by the I-CSCF entity or the other I-CSCF entity different from the I-CSCF entity.

Referring to FIG. 6, a structural view of another embodiment of a device for providing services for a user according to an embodiment of the present invention is shown, and the device includes a capability set request receiving module and an information returning module.

The capability set request receiving module is adapted to receive a second request message requesting the capability set or name of the S-CSCF providing services for the user sent by the I-CSCF.

The information returning module is adapted to return the capability set or name of the S-CSCF to the I-CSCF when it is determined that a last S-CSCF selection for the user has finished or been overtime.

The capability set request receiving module is further adapted to receive a first request message requesting the capability set or name of the S-CSCF providing services for the user and return a first request response message carrying the capability set or name of the S-CSCF.

The device further includes a setting module adapted to set a mark of the S-CSCF entity selection being made or set a timer and start timing after the capability set request receiving module returns the first request response message carrying the capability set or name of the S-CSCF.

The device further includes a mark clearing module adapted to clear the mark of the S-CSCF selection being made or clear the timer when the information returning module determines that the last selection of the S-CSCF for the user has finished or been overtime.

The device further includes an error returning module adapted to return an error response message to the I-CSCF when the information returning module determines that the last S-CSCF selection for the user has not finished or been overtime. The error response message is used to inform the I-CSCF that the HSS is making the S-CSCF selection.

In the above embodiments, the I-CSCF entities that process user's concurrent service request can be the same one or be different I-CSCF entities.

Figure 9:
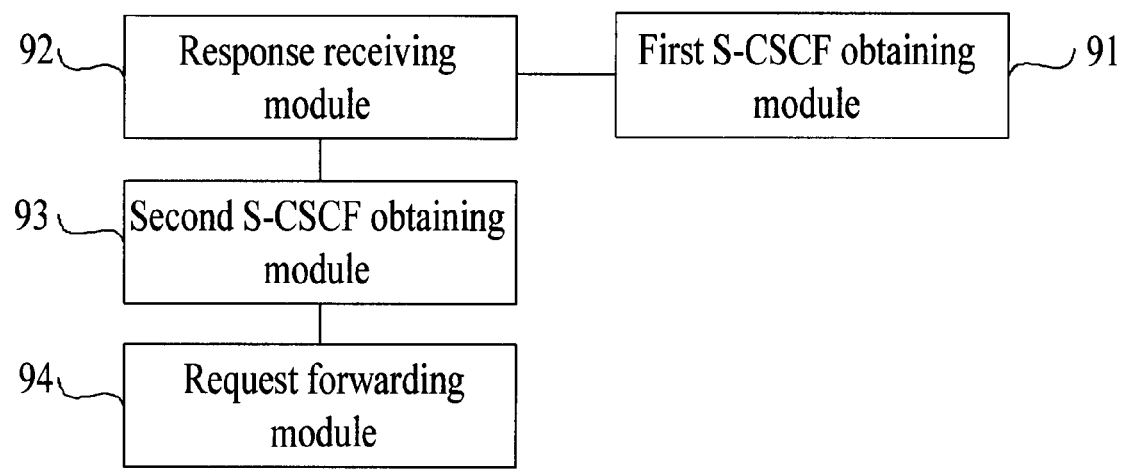
FIG. 9 is a structural view of a device for providing services for a user according to a third embodiment of the present invention.

Referring to FIG. 9, a structural view of a device for providing services for a user according to an embodiment of the present invention is shown. The device includes a first S-CSCF obtaining module 91, a response receiving module 92, a second S-CSCF obtaining module 93, and a request forwarding module 94.

The first S-CSCF obtaining module 91 is adapted to request, from an HSS, a capability set of an S-CSCF, select a first S-CSCF for the user according to the capability set of the S-CSCF returned by the HSS, and forward the service request from the user to the first S-CSCF.

The response receiving module 92 is adapted to receive a failure response returned by the first S-CSCF after the service request is forwarded to the first S-CSCF. The failure response represents that the HSS has assigned another S-CSCF different from the first S-CSCF to the user.

The second S-CSCF obtaining module 93 is adapted to obtain information of a second S-CSCF after receiving the failure response returned by the first S-CSCF. The second S-CSCF is an S-CSCF currently recorded by the HSS for the user.

The request forwarding module 94 is adapted to forward the service request from the user to the second S-CSCF after receiving the information of the second S-CSCF.

The device described in the embodiments of the present invention is an I-CSCF.

The second S-CSCF obtaining module 93 is further adapted to again request, from the HSS, the name or capability set of the S-CSCF and receive the name of the second S-CSCF returned by the HSS after receiving the failure response returned by the first S-CSCF, or obtain the information of the second S-CSCF from the capability set of the S-CSCF returned by the HSS after receiving it.

The response receiving module 92 is further adapted to receive the failure response carrying the name of the second S-CSCF and returned by the first S-CSCF. The second S-CSCF obtaining module 93 obtains the information of the second S-CSCF according to the received failure response carrying the name of the second S-CSCF and returned by the first S-CSCF.

When the user does not register with the network and there is no name of the S-CSCF providing services for the user stored in the HSS, or when the user has an unregistered termination request or an unregistered initiation request initiated by AS instead of the user and a registration request, if the I-CSCF receives the failure response of the S-CSCF selected for providing unregistered services for the user, the I-CSCF obtains the second S-CSCF according to the name of the S-CSCF currently providing services for the user and carried by the failure response, or through again requesting, from the HSS, the name or capability set of the S-CSCF, and sends the service request to the second S-CSCF, thereby enabling the unregistered services to be provided for the user to avoid call lost. Alternatively, when the HSS receives the request message requesting the capability set of the S-CSCF from the I-CSCF, the HSS will not return the LIA immediately if it is determined that the last S-CSCF selection has not completed. Until the HSS receives the SAR services data request or the MAR message of the S-CSCF selected for the user and the name of the S-CSCF is saved, it returns the name of the S-CSCF to the I-CSCF through the LIA, so as to solve the problem that may occur when a user is simultaneously assigned with two S-CSCFs. Thus, normally providing services for the user is guaranteed.

Through the above description of the implementation, it is clear to persons skilled in the art that the present invention may be accomplished through hardware, or through software plus a necessary universal hardware platform. Based on this, the technical solutions of the present invention may be embodied in the form of a software product. The software product may be stored in a nonvolatile storage media (such as, a CD-ROM, a USB flash drive, or a removable hard disk) and contain several instructions adapted to instruct computer equipment (such as, a personal computer, a server, or network equipment) to perform the method according to the embodiments of the present invention.

The above descriptions are merely preferred embodiments of the present invention, but not intended to limit the scope of the present invention. Any modification, equivalent replacement, or improvement made without departing from the spirit and principle of the present invention should fall within the protection scope of the present invention.

What is claimed is:

1. A method for providing services for a user, comprising:
    receiving, by an interrogating call session control function (I-CSCF), a failure response returned by a first serving call session control function (S-CSCF) according to a failure indication information, wherein the failure indication information is returned by a home subscriber server (HSS) after the HSS receives a request for requesting subscription data of the user sent by the first S-CSCF and determines that a stored name of the S-CSCF assigned to the user is not the same as that of the first S-CSCF, and the receiving is performed after the I-CSCF selects the first S-CSCF for the user and forwards a service request to the first S-CSCF; and
    obtaining, by the I-CSCF, information of a second S-CSCF, and forwarding the service request from the user to the second S-CSCF, wherein the second S-CSCF is the one assigned by the HSS for the user.

2. The method for providing services for a user according to claim 1, wherein the obtaining, by the I-CSCF, the information of the second S-CSCF comprises:
    requesting from the HSS, by the I-CSCF, the name of the second S-CSCF, and receiving, by the I-CSCF, the name of the second S-CSCF returned by the HSS.

3. The method for providing services for a user according to claim 2, wherein the forwarding, by the I-CSCF, the service request from the user to the second S-CSCF comprises:
    forwarding, by the I-CSCF, the service request from the user to the second S-CSCF according to the name of the second S-CSCF returned by the HSS.

4. The method for providing services for a user according to claim 1, wherein the receiving, by the I-CSCF, the failure response returned by the first S-CSCF comprises:
    returning, by the HSS, the failure indication information carrying the name of the second S-CSCF to the first S-CSCF; and
    receiving, by the I-CSCF, the failure response carrying the name of the second S-CSCF and sent by the first S-CSCF according to the failure indication information.

5. The method for providing services for a user according to claim 4, wherein the obtaining, by the I-CSCF, the information of the second S-CSCF comprises:
    obtaining, by the I-CSCF, the information of the second S-CSCF from the failure response carrying the name of the second S-CSCF.

6. The method for providing services for a user according to claim 1, wherein after the I-CSCF forwards the service request from the user to the second S-CSCF, the method further comprises:
    requesting from the HSS, by the second S-CSCF, the subscription data of the user; and
    receiving, by the second S-CSCF, the subscription data of the user returned by the HSS, and processing the service request from the user.

7. A device for providing services for a user, comprising:
a response receiving module, adapted to receive a failure response returned by a first serving call session control function (S-CSCF) according to a failure indication information, where the failure indication information is returned by a home subscriber server (HSS) after the HSS receives a request for requesting subscription data of the user sent b the first S-CSCF and determines that a stored name of the S-CSCF assigned to the user is not the same as that of the first S-CSCF, and the receiving is performed after the first S-CSCF is selected for the user and a service request is forwarded to the first S-CSCF;
a second S-CSCF obtaining module, adapted to obtain information of a second S-CSCF after the failure response returned by the first S-CSCF is received, wherein the second S-CSCF is the one assigned by the HSS for the user; and
a request forwarding module, adapted to forward the service request from the user to the second S-CSCF after the information of the second S-CSCF is obtained.

8. The device for providing services for a user according to claim 7, wherein the device is an interrogating call session control function (I-CSCF).

9. The device for providing services for a user according to claim 8, further comprising:
a first S-CSCF obtaining module, adapted to request, from an HSS, a capability set of an S-CSCF, select a first S-CSCF for the user according to the capability set of the S-CSCF returned by the HSS, and forward the service request from the user to the first S-CSCF.

10. The device for providing services for a user according to claim 9, wherein the second S-CSCF obtaining module is further adapted to request, from the HSS, the name of the second S-CSCF and receive the name of the second S-CSCF returned by the HSS after receiving the failure response returned by the first S-CSCF.

11. The device for providing services for a user according to claim 9, wherein the response receiving module is further adapted to receive the failure response carrying the name of the second S-CSCF and returned by the first S-CSCF; and the second S-CSCF obtaining module is adapted to obtain the information of the second S-CSCF according to the received failure response carrying the name of the second S-CSCF and returned by the first S-CSCF.

12. A system for providing services for a user, comprising:
an interrogating call session control function (I-CSCF), configured to select a first serving call session control function (S-CSCF) for the user and forward a service request to the first S-CSCF;
the first S-CSCF, configured to return a failure response to the I-CSCF according to a failure indication information returned by the HSS;
the HSS, configured to return the failure indication information to the first S-CSCF after the HSS receives a request for requesting subscription data of the user sent by the first S-CSCF and it is determined that a stored name of the S-CSCF assigned to the user is not the same as that of the first S-CSCF; and
the I-CSCF, further configured to obtain information of a second S-CSCF after the I-CSCF receives the failure response returned by the first S-CSCF.

13. The system for providing services for a user according to claim 12, wherein
the HSS, further configured to return the failure indication information carrying the name of the second S-CSCF to the first S-CSCF; and
the I-CSCF, further configured to receive the failure response, which is sent by the first S-CSCF according to the failure indication information, carrying the name of the second S-CSCF.

14. The system for providing services for a user according to claim 12, wherein
the I-CSCF, further configured to forward the service request from the user to the second S-CSCF, wherein the second S-CSCF is the one assigned by the HSS for the user.

* * * * *